United States Patent [19]

Thompson et al.

[11] Patent Number: 4,793,934

[45] Date of Patent: Dec. 27, 1988

[54] METHOD FOR ENHANCING THE SEPARATION CAPACITY OF A MULTI-BED FILTRATION SYSTEM

[75] Inventors: Robert E. Thompson, Houston, Tex.; Kurt M. Geiser, Minneapolis, Minn.

[73] Assignee: Signal Environmental Systems, Inc., Hampton, N.H.

[21] Appl. No.: 41,307

[22] Filed: Apr. 22, 1987

[51] Int. Cl.[4] ............................................. C02F 1/52
[52] U.S. Cl. .................................. 210/715; 210/786; 210/793; 210/798
[58] Field of Search ............... 210/715, 786, 793, 795, 210/798, 203

[56] References Cited

U.S. PATENT DOCUMENTS

| | | | |
|---|---|---|---|
| Re. 28,458 | 7/1975 | Ross | 210/80 |
| 1,893,451 | 1/1933 | Smith | 210/715 |
| 2,108,168 | 2/1938 | Jenks | 210/715 |
| 2,128,393 | 8/1938 | Allen | 210/715 |
| 2,382,490 | 8/1945 | Lawlor | 210/715 |
| 3,516,930 | 6/1970 | Ross | 210/32 |
| 3,587,861 | 6/1971 | Ross | 210/277 |
| 3,651,942 | 3/1972 | Berardi | 210/203 |
| 3,792,773 | 2/1974 | Ross | 210/42 |
| 3,817,378 | 6/1974 | Ross | 210/80 |
| 3,840,117 | 10/1974 | Ross | 210/80 |
| 4,032,443 | 6/1977 | Ross | 210/82 |
| 4,093,544 | 11/1976 | Ross | 210/59 |
| 4,197,205 | 4/1980 | Hirs | 210/275 |
| 4,222,877 | 9/1980 | Silva | 210/411 |
| 4,377,485 | 3/1983 | Krofta | 210/704 |
| 4,515,697 | 5/1985 | Elmaleh et al. | 210/715 |
| 4,547,286 | 10/1985 | Hsiung | 210/738 |
| 4,608,181 | 8/1986 | Hsiung et al. | 210/786 |

OTHER PUBLICATIONS

Hudson, "Physical Aspects of Filtration," *JAWWA*, vol. 61, Jan. 1969, pp. 3-7.

*Primary Examiner*—Peter Hruskoci
*Attorney, Agent, or Firm*—Klarquist, Sparkman, Campbell, Leigh & Whinston

[57] ABSTRACT

A multi-bed filtration system includes an upstream filter bed in series with a downstream filter bed of nonbuoyant media. Also included is a system for periodically backwashing the nonbuoyant filter bed. Coagulant-treated water is passed through the upstream filter bed, followed by the downward flow of water through the downstream filter bed. Thereafter, the downward flow of water through the downstream filter bed is periodically interrupted. During these interruptions, a limited amount of water is introduced upwardly through the downstream filter bed by the backwashing system. Such backwashing frees coagulated solids within the bed, causing the solids to move upwardly through the bed. The solids ultimately collect in a zone above the surface of the bed. When normal filtration recommences, water passes through the deck of solids in the zone prior to entering the nonbuoyant filter bed.

3 Claims, 7 Drawing Sheets

METHOD FOR ENHANCING THE SEPARATION CAPACITY OF A MULTI-BED FILTRATION SYSTEM

BACKGROUND OF THE INVENTION

The present invention generally relates to a method of purifying water by filtration. More specifically, it relates to an improved water purification method in which influent water passes through a floc deck upstream of a filter bed.

Considerable developments have been made in improving the efficiency of systems for separating solids from liquids. In order to minimize the processing time and amounts of chemical agents needed for purification, it is important that a system be designed to operate as efficiently as possible.

One method of improving the efficiency of solids separation involves the formation of a zone of fluidized solids within a chamber through which influent water is passed. The zone of fluidized solids is derived from previously collected solid materials. For example, U.S. Pat. No. 1,893,451 to Smith involves the treatment of water with flocculating chemicals in a flocculation tank. The tank is designed so that water flows through zones of high turbidity prior to sedimentation. The zones of high turbidity allow newly formed floc particles to come into contact with previously formed floc particles, thereby stimulating the floc growth process and removal of contaminants.

U.S. Pat. No. 2,128,393 to Allen discloses a system consisting of flocculation and clarification chambers in series. Specifically, influent water is first combined with a flocculating chemical in the flocculation chamber to produce a fluid-solid suspension which subsequently passes into the clarification chamber. The suspension in the claification chamber is said to have a filtering action on influent liquid.

U.S. Pat. No. 2,382,490 to Lawlor involves a method and apparatus for treating water in which water is initially contacted with a precipitating agent. Thereafter, a coagulant is added to the water and the mixture is routed into a settling tank. The settling tank has an agitator which causes the mixture to form a blanket of sludge in the tank. Thereafter, water is routed upward through the settling tank and sludge blanket to accomplish filtration.

U.S. Pat. No. 3,587,861 to Ross discloses a filter bed of sand-type media on which a layer of solid waste materials collects during normal filtration. The layer is periodically agitated to form a suspension through which water can pass. The agitation, which is provided through mechanical means and can be assisted by the introduction of diffused air, is said to increase the filtering action of the total installation. Related technology is disclosed in U.S. Pat. Nos. 3,840,112; 3,516,930; 3,792,773; 3,817,378; 4,032,443 and Re. 28,458, all to Ross.

U.S. Pat. No. 4,608,181 discloses a particularly effective two stage filtration apparatus which does not employ a sludge blanket to enhance solids separation.

The present invention involves a method for enhancing the filtration capacity of such a multi-bed filter system in a substantially different manner from the above-described methods. The invention is characterized by improved filtration capacity, efficiency and economy.

SUMMARY OF THE INVENTION

It is an object of the present invention to provide a method for improving the efficiency of a multi-bed filter apparatus which is characterized by improved filtration capacity and lower operating costs.

It is another object of the invention to provide a method for improving the efficiency of a multi-bed filter apparatus which mimimizes the amount of chemical additives necessary for purification.

It is a further object of the invention to provide a method for improving the efficiency of a multi-bed filter apparatus which uses simple and efficient hardware to accomplish filtration.

It is an even further object of the invention to provide a method for improving the efficiency of a multi-bed filter apparatus which reduces the amount of backwashing necessary to clean the apparatus.

To accomplish these and other objects, a multi-bed filtration system is provided which includes an upstream filter bed in series with a downstream filter bed of nonbuoyant media. Also included is a system for periodically backwashing the downstream filter bed. Preferably, the upstream filter bed comprises buoyant media so that, in operation, influent water is passed upwardly through the buoyant filter bed, followed by downward movement of the water through the nonbuoyant filter bed. Thereafter, the downward flow of water through the downstream, nonbuoyant filter bed is periodically interrupted at selected time intervals. During these interruptions, water is introduced upwardly through the downstream nonbuoyant filter bed for five to seven seconds by the bcckwashing sYstem. Such short duration backwashings are conducted so as to free coagulate solids trapped within the bed, and cause the solids to move upwardly through the bed into the liquid thereabove. The solids ultimately collect in a zone above the surface of the bed and form a floc deck. When normal filtration resumes, water passes through the floc deck prior to entering the downstream, nonbuoyant filter bed.

The floc deck is establisbed and maintained by conducting the short duration backwashings as often as needed to maintain an adequate filtration rate. The use of short duration backwashings to form a floc deck, in combination with the filtering abilities of the two filter beds, results in superior filtration capacity and increased operating efficiency.

These and other objects, features, and advantages of the invention will be further described in the following detailed description and drawings.

DETAILED DESCRIPTION

Filtration systems according to the present invention remove solids from liquids by passing a stream of liquid through a two stage filter including an upstream roughing filter in series with a downstream filter. The filter beds can consist of either a buoyant or nonbuoyant media. The upstream filter media should have an effective size of between 1.5 and 20 mm. But, to achieve most effective filtration, the media for the upstream filter is chosen depending upon the nature of the raw water to be filtered. For example, optimal filtration of storm water or of effluent from a biological treatment clarifier, requires a media having an effective size of between about 2.0 and 10.0 mm in diameter.

Preferred filter systems used in accordance with the invention include the following filtration systems which have an upstream filter containing buoyant media and a downstream filter containing nonbuoyant media.

A. Description of the Filter System of FIGS. 1, 2, and 3

Figure 1:
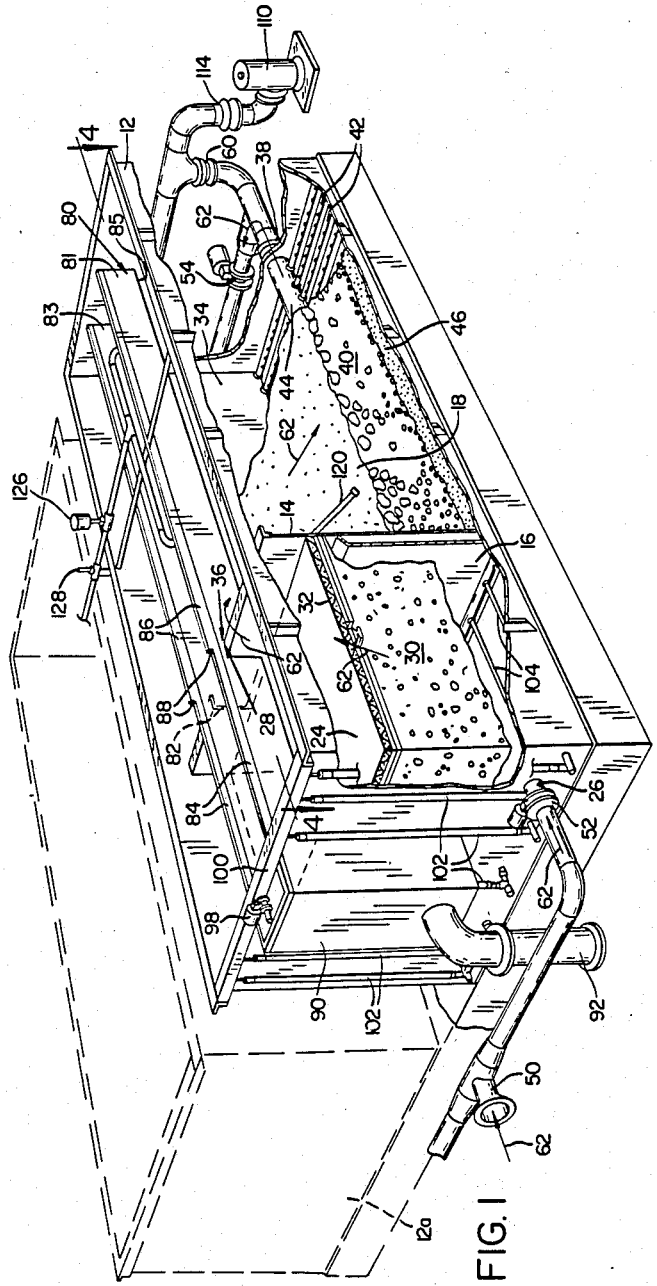
FIG. 1 is a perspective view of a first embodiment of a filter system according to the present invention shown partially in section.

With reference to FIG. 1, a water filtration system is illustrated which comprises a hollow, rectangular tank 12 which is separated by an internal, upright wall 14 into an upflow filter compartment or vessel 16 and a downflow filter compartment or vessel 18. In a typical water treatment plant, two or more tanks 12, 12a are provided in tandem. Therefore, while the filters in one such tank are being cleaned, the filters in the other tank are operational so that the plant continuously treats water.

The upflow filter vessel 16 provides an internal passageway 24 for water moving therethrough. An inlet 26 is provided near the base of a vessel 16 for supplying influent raw water into the passageway 24. An outlet 28 is located near the top of the vessel, in this case over the top of the center wall 14, for removing partially filtered water from the passageway 24.

Located between the inlet 26 and the outlet 28 is a bed of buoyant media particles 30 which collects impurities as water to be filtered moves upwardly through the bed. This media has a specific gravity such that it is buoyant in upwardly flowing water during filtration and should have a specific gravity of no less than 0.80. Most preferably, the media particles should have a specific gravity of no less than 0.90. Such particles typically have a uniformity coefficient of no greater than 2.0, and a sphericity of less than 0.7. One example of a suitable bed material comprises angularly shaped polypropylene pellets with a specific gravity of 0.90, effective sizes of 2.5 mm, and a uniformity coefficient of about 1.8. Of course, other suitable media may be utilized.

A horizontal buoyant media retaining apparatus such as a screen 32 positioned across an upper region of the filter vessel 16 prevents passage of the buoyant filter media outwardly through the outlet 28. Screen 32 is constructed so that it may be easily removed from above for cleaning purposes.

The downflow filter vessel 18 also provides an internal passageway 34 for water moving therethrough. An inlet 36, communicating with the upflow filter vessel outlet 28 over the top of a wall 14, is provided for supplying partially filtered water from the upflow filter vessel into the passageway 34. An outlet 38 is located near the bottom of the downflow vessel for removing filtered water from the passageway 34.

Located between the inlet 36 and outlet 38 is a bed of nonbuoyant media particles 40 which filters impurities as the water moves downwardly through the bed. Preferably, the bed 40 comprises a mixed media filter, such as shown in U.S. Pat. No. 3,343,680. Such a bed is hydraulically graded from coarse to fine in the direction of filtration. As a more specific description, an exemplary bed is approximately thirty inches deep and is composed of three or four materials, each of a different size and specific gravity, so as to provide a uniform void distribution through the bed in the direction of filtration.

Conventional water collection laterals 42 and header or main line 44 are positioned at the lower region of the bed 40 and lead to the downflow filter vessel outlet 38. These water collector lines are covered by a layer of gravel 46. The uppermost region of this gravel layer is of high density. This aids in stabilizing the gravel bed when backflush water passes upwardly from the laterals 42 during cleaning of the nonbuoyant media filter bed.

During normal operation, raw water to be treated is fed through a conduit 50 (FIG. 2) and an open flow control valve 52 to the upflow vessel inlet 26. Water entering inlet 26 flows upwardly through the buoyant media bed, over the top of the wall 14, and downwardly through the nonbuoyant media filter bed to the downflow filter vessel outlet 38. From outlet 38, the treated water passes though an open effluent flow rate control valve 54 and to an effluent drain line 56 (FIG. 3) which leads to a clear well 58. At this time, a backwash valve 60 is closed to prevent the flow of backwash water to the outlet 38 of the downflow filter compartment. Arrows 62 (FIG. 1) indicate the flow of water through the system under these oonditions.

Figure 2:
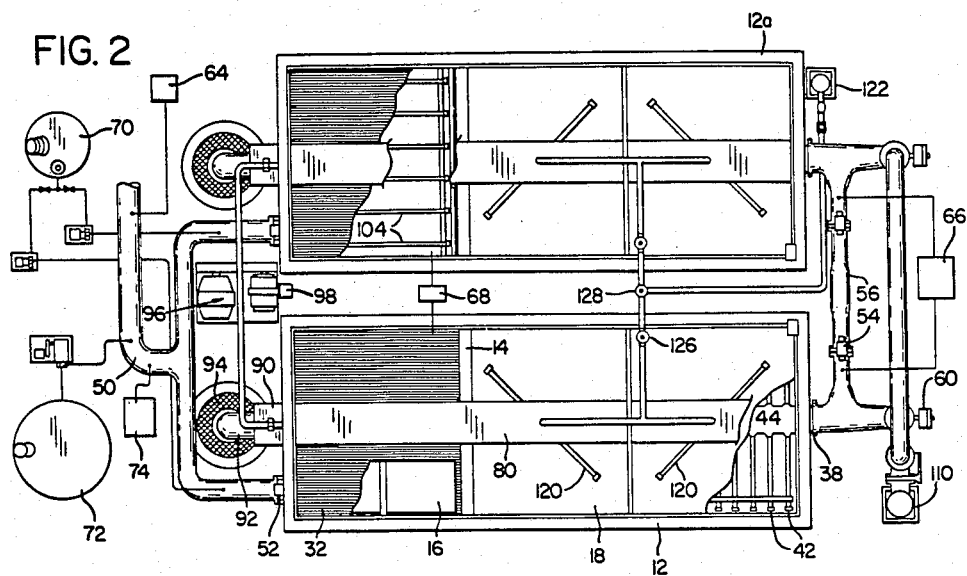
FIG. 2 is a top plan view of the filter system shown in FIG. 1.

With reference to FIG. 2, one or more chemical feed devices are provided for injecting chemicals directly into the raw water stream as it passes through the conduit 50. For example, a polymer feed device 70 may be provided for injecting coagulant into the raw water stream, an alum feed device 72 may be provided for injecting aluminum sulfate into the raw water stream, and another such device 74 may be provided for injecting lime or soda ash into the raw water stream to alter its pH. Of course, other chemicals and materials may be injected, depending upon the characteristics of the water being treated. For example, powdered activated carbon may be adddd to remove undesirable taste and odors from the water.

Turbidity and other characteristics of the raw water may be monitored upstream of the filter compartment 16. In addition, these characteristics may also be monitored in the effluent line. Turbidity meters or other conventional monitoring devices 64, 66 are provided for this purpose. A sensor 68 may also be provided for monitoring the pH of the treated water. This monitoring of water characteristics facilitates close control of chemical dosage to minimize the waste of expensive treatment chemicals. For example, an operator can adjust the rate of coagulant supplied from the chemical feed device 70 in the event of a variation in the turbidity of the influent or effluent water.

Lower coagulant dosages are required for separation of solids using a buoyant media filter rather than a settling-type clarifier. Furthermore, with an upflow buoyant media filter and downflow nonbuoyant media system, flocculation and clarification of the raw water takes place within the buoyant media filter. This eliminates the need for settling-typ clarifier and results in a much more compact system.

The cleaning apparatus for the water filtration system of FIG. 1 will next be described. It is important that the upflow filter vessel compartment be provided with a waste discharge outlet which is at an elevation above the upflow filter vessel outlet 28. In addition, the downflow filter vessel is provided with a waste outlet at an elevation which is above the elevation of the upflow filter vessel waste outlet.

To accomplish this, in the illustrated preferred embodiment, a trough 80 is provided within an upper region of the tank 12 and extends lengthwise from one end of wall of the tank 12 to the opposite end wall. The trough 80 has upright side walls 81, 83 and a base 85, and is centrally positioned within the tank. The wall 14 is cut out at 82 for passage of the trough therethrough. Adjustable weir plates are mounted to the respective upper edges of the trough. A first set of such weir plates 84 are mounted to the trough in the region above the upflow filter compartment 16, while a second set of weir plates 86 are mounted to the trough above the downflow filter compartment 18. The weir plates 86 are higher than the weir plates 84 so that, in essence, the trough steps up at 88.

As explained below, during cleaning of the buoyant media bed, waste material and water flow over the weir plates 84 and into the trough 80. Similarly, during cleaning of the nonbuoyant media bed 40, waste materials and water flow upwardly over the higher weir plates 86 and into the trough 80. Thus, for purposes explained below, the waste outlet from the filter vessel 18 is effectively at a higher elevation than the waste outlet from the filter vessel 16. From trough 80, the waste flows into a well 90 at one end of the tank 12, through a conduit 92, and to a sump 94 (FIG. 2).

An air scouring system is also provided for cleaning the buoyant media bed. With reference to FIGS. 1 and 2, this air scouring system includes an air supply 96, including a blower coupled to an air control valve 98, which in turn is connected to a manifold 100 (FIG. 1). Plural upright air supply tubes 102 deliver air from the manifold to respective perforated air delivery laterals 104 located beneath the buoyant media filter bed. When air from laterals 104 flows upwardly through the bed, the bed expands and is scoured by the air so that solids trapped therein are dislodged and carried ottwardly through the trough 80 as explained below.

A mechanism is also provided for cleaning the nonbuoyant media bed 40. With reference to FIGS. and 3, this latter bed cleaning apparatus includes a backwash pump 110 for pumping cleaning water, via a conduit 112, from a clear well or backflush water tank 58. The pumped flush water passes through a backflush rate control valve 114 and through the backflush valve 60 to the downflow filter vessel outlet 38. From outlet 38, the backflush water flows through the line 44, the laterals 42, and upwardly through the nonbuoyant media bed to the trough 80. During times when the backflush valve 60 is open, the effluent line valve 54 (FIG. 3) is closed to prevent cycling of the backflush water directly to the clear well 58.

In addition, the downflow filter vessel is provided with one or more conventional rotary filter surface agitators 120 for delivering jets of water to the surface of the nonbuoyant media bed. These water jets break up the mat of solids deposited on the bed and facilitates its cleaning. A surface wash pump 122 pumps water through a conduit 124 from the clear well, through a surface wash valve 126, and to the rotary agitators 120 at time when the fixed media bed is cleaned. A vacuum release valve 128 is also provided in the surface wash supply line leading from the pump 122 to the valve 126.

B. Operation of the Filter System of FIG. 1

Figure 4:
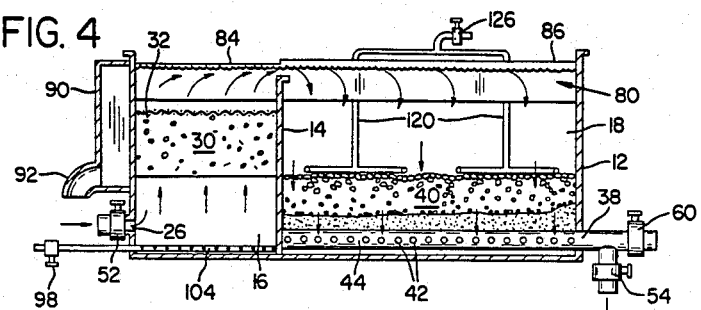
FIG. 4 is a vertical section view of the system of FIG. 1, taken along line 4—4 thereof, and showing water being treated.
Figure 5:
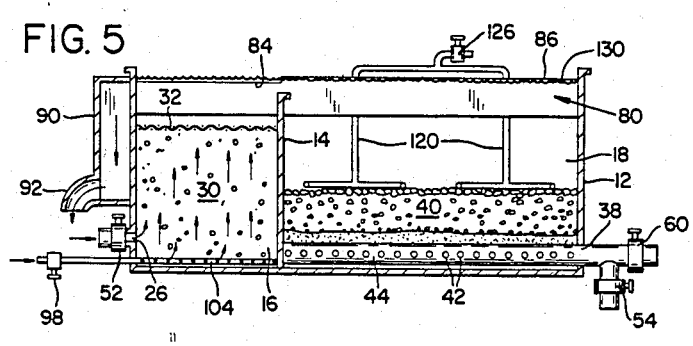
FIG. 5 is a vertical section view of the system of FIG. 1, taken along line 4—4 thereof, and showing the buoyant media filter being cleaned.
Figure 6:
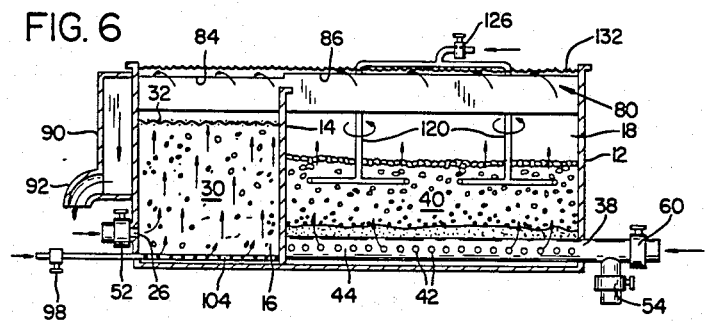
FIG. 6 is a vertical section view of the system of FIG. 1, taken along line 4—4 thereof, and showing the buoyant and nonbuoyant media filters being cleaned.

With reference to FIGS. 4, 5, and 6, the operation of the water filtration system of FIG. 1 will be described.

Figure 3:
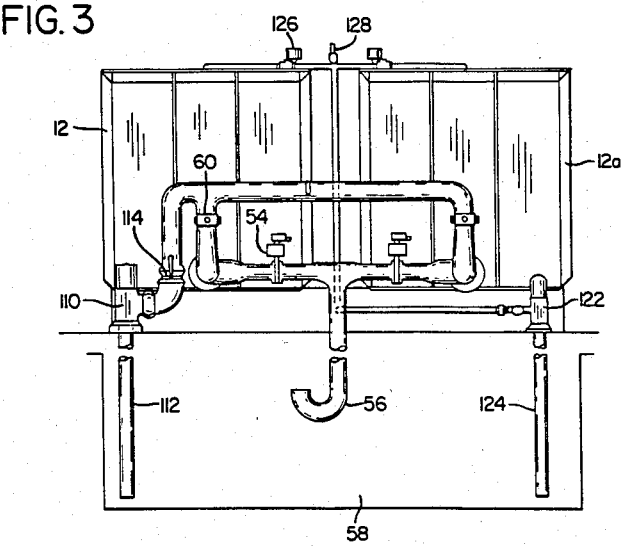
FIG. 3 is an end elevation view of the effluent end of the system of FIG. 1.

During normal operation, as shown in FIGS. 1 and 4, raw influent water enters the filter vessel 16 through inlet 26. This water flows upwardly through the buoyant media bed 30, over the top of the wall 14, and into the downflow filter vessel 18. From there, the water passes through the nonbuoyant media bed 40, laterals 42, main line 44, and to the downflow filter vessel outlet 38. At such times, the backflush water supply valve 60 is closed while the effluent line oulet valve 54 is open. Consequently, the treated water flows from the outlet 38 into the clear well 58 (FIG. 3).

The bulk of the filtration takes place in the buoyant media filter. Depending upon water conditions, typically anywhere from 70% to 95% of suspended material is removed from the raw water by the buoyant media filter. Through mixing, contact flocculation, and turbidity removal, the buoyant media filter provides an efficient initial treatment of the raw water. Because of the quantity of material removed in this first filter stage, it is desirable to clean the buoyant media filter more frequently, and independently of, the nonbuoyant media filter. This increases the amount of time that the system may operate between runs, that is, between cleaning of the nonbuoyant media filter. Partial cleaning of the buoyant media filter is apparently all that is required to maintain the system in continuing operation. During such partial cleaning, some of the deposited solids that are carried out from the filter by way of the trough 80, as explained below, while others are merely redistributed within the filter bed. Eventually, a steady state or equilibrium condition is reached, wherein each cleaning cycle removes a fixed amount of solids from the buoyant media filter bed. Because of this partial cleaning, and because of the efficient cleaning system utilized in the present invention, less flush time, flush water, and air are required during the cleaning process. In addition, there is less waste water from cleaning that has to be disposed of.

Another advantage of partial cleaning is that flocculation within the buoyant media filter is enhanced by contact with previously deposited solids which remain in the filter, even after it is cleaned. Thus, fewer floc chemicals are required. Also, it is advantageous to leave a certain amount of deposited solids in a buoyant media filter, as the solids reduce the size of the pores of the filter and assist in filtration.

Typically, partial cleaning of the buoyant media filter is accomplished sporadically, or at periodic predetermined time intervals, or in response to conventional pressure sensors which sense a change in head loss through the buoyant media flter.

With reference to FIG. 5, in a typical application, following partial cleaning of the buoyant media filter and at a flow rate of approximately 10 gallons per minute per square foot of filter area, the head loss is from 0.7 to one foot. If sufficient solids are deposited within the bed so as to increase the head loss across the bed to, for example, four feet, then partial cleaning of the buoyant media filter may be accomplished as follows.

The plant effluent valve 54 is temporarily closed. At the same time, the raw water influent valve 52 remains open. As a result, the water within the compartment 16 rises. In addition, the water within compartment 18 also rises because of the open communication between these two compartments over the central wall 14.

After the water rises to a predetermined level within the compartment 16, as sensed by a level switch (not shown) the influent valve 52 temporarily closes. The air inlet valve 98 is then opened, and the blower of air supply 96 turns on. Air is then distributed from the laterals 104 and upwardly through the buoyant media bed. This upwardly flowing air causes the bed to expand and fluidize. Furthermore, the air scours excess solids from the buoyant media bed and forms a slurry within the upflow compartment 16. After a short delay to enable the formation of the slurry, the influent valve 52 reopens so that raw water again enters the compartment 16. Cleaning may also be accomplished without halting the influent water flow.

Under these conditions, when the water reaches the top of weir plates 84, it spills over the lip of these weir plates and into the trough 80. From trough 80, the wastes are carried to the well 90 and through conduit 92 to the waste water sump. This water flushes dislodged solids from the buoyant media filter. However, because of the lower elevation of the weirs 84 in comparison to the weirs 86, the water level as indicated by number 130 remains below the top of the weir plates 86. Consequently, during cleaning of the buoyant media bed, partially teeated water from the downflow filter vessel 18 is no lost. In addition, there is very little undesirable carryover of solids from the buoyant media bed across the top of the wall 14 and into the downflow filter vessel 18. This is because, in effect, a wall of water above the wall 14 acts as a plug to minimize this solids transfer.

Cleaning of the buoyant media bed typically takes about two to five minutes. Following cleaning, the air flow is stopped, the effluent valve 54 is reopened, and normal operation of the water treatment system continues.

With this cleaning system, it is unnecessary to use water flowing at other than tee normal influent flow rate for cleaning purposes. Thus, there is no need for a separate backwash pump and backwash water storage system for cleaning the buoyant media filter. Also, the degree of solids flushing from the buoyant media filter depends upon the total wash volume. This flushing can be completed at any flow rate, with the duration of the cleaning being adjusted, depending upon the influent flow rate. Furthermore, such cleaning is almost totally temperature insensitive. Therefore, the flush rate does not have to be adjusted for chagging water temperatures.

The retaining screen 32 is of a corrosion resistant material which allows passage of the dislodged solids therethrough, but retains the bed in place. Retainer 32 is automatically scoured during each flush cycle to prevent it from clogging. In addition, it can be easily removed from above for cleaning purposes.

Complete cleaning of the nonbuoyant media filter will be described with reference to FIG. 6. Conventional water level sensors are provided within the downflow filter compartment 18 to maintain the water level within thi compartment at a constant level. Under such conditions, as solids collect within the nonbuoyant media filter, the resulting head loss across this filter produces a correspondingly lower pressure in the header line 44. A conventional pressuee switch (not shown) senses a predetermined low pressure to start the nonbuoyant media backwas cycle. Of course, this bed may be sporadically cleaned, or cleaned at predetermined time intervals as well.

Upon commencement of the cleaning cycle, the effluent valve 54 is closed while the influent valve 52 remains open. Consequently, the water level within both the compartments 16 and 18 rises. Once the water level rises to a predetermined level as determined by level switches (not shown), valve 126 is opened to supply surface wash water to the rotatable agitators 120. Water from these agitators breaks up a mat of deposited solids collected on the surface of the nonbuoyant media filter. These agitators facilitate quick fluidization and a bed expansion, as well as providing auxiliary agitation in the scrubbing of the bed particles. Typically, one-half to one gallon of water per minute per square foot of filter bed is provided through these agitators. Thereafter, the backwash pump 110 is started while valve 60 is opened. Clean water from the clear well 58 is pumped at a controlled rate to the downflow filter compartment 18, the rate being determined by the setting of backwash rate control valve 114 (FIG. 1). The rate of flushing is determined in a conventional manner, is temperature-sensitive, and is typically established at fifteen gallons per minute per square foot of filter area at 60° F. The backwash water flows upwardly from the laterals 42 and through the nonbuoyant media bed 40. Under these conditions, the nonbuoyant media bed fluidizes and expands by approximately twenty percent. Also, the filter particles within the bed roll and scrub against each other to dislodge deposited solids. As can be seen in FIG. 6, the water level rises above the level of the weir plates 86 so that the solids and water from the compartment 18 pass over these weir plates, into the trough 80, and then to the waste system.

Typically, the buoyant media filter bed is cleaned simultaneously with the cleaning of the nonbuoyant media filter bed. In such a case, the cleaning steps for the buoyant media filter bed proceed as previously described.

Thus, the cleaning system of this inventon uses a common waste water trough in cleaning both the nonbuoyant and buoyant media bed, thereby eliminating an otherwise expensive duplication of equipment. In addition, the number of valves and pumps utllized in the cleaning system are minimized, reducing the cost of the overall system.

Also, with this arrangement of cleaning system, an extremely compact water filtration system apparatus is provided.

C. Filtration systems of FIGS. 7 through 11.

Figure 7:
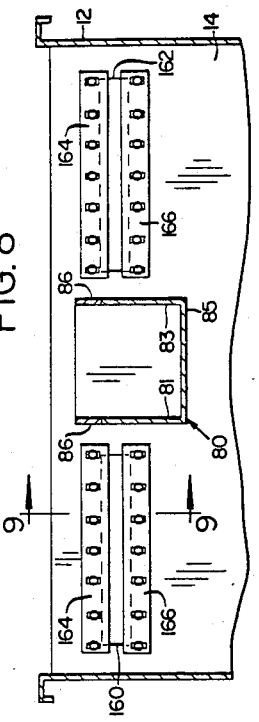
FIG. 7 is a side elevation view of a portion of a central wall of an alternate embodiment of a water treatment system in accordance with the invention.

FIG. 7 illustrates a modification to the water filtration system of FIG. 1. In this embodiment, the central wall 14 is provided with at least one, and in the illustrated case, two openings 160, 162 communicating between the upflow filter compartment 16 and the downflow filter compartment 18. In addition, these openings are positioned below the elevation of the weir plates 84, 86 but in an upper region of the wall. Also, the upper end of the wall 14 is extended upwardly to prevent the flow of water over the top of the wall between the compartments. Instead, the partially treated water from the compartment 16 flows through the respective openings 160, 162 and into the compartment 18 during the water filtration operation.

By restricting the size of such openings to the minimum size required for normal operation of the system, the area of direct communication between the compartments 16 and 18 is reduced. Consequently, during cleaning of the buoyant medaa filter, the undesired pass through of dislodged solids from upflow compartment 16 into downflow compartment 18 is reduced. Otherwise, the embodiment of FIG. 7 operates in the same manner as that of FIG. 1.

Figure 8:
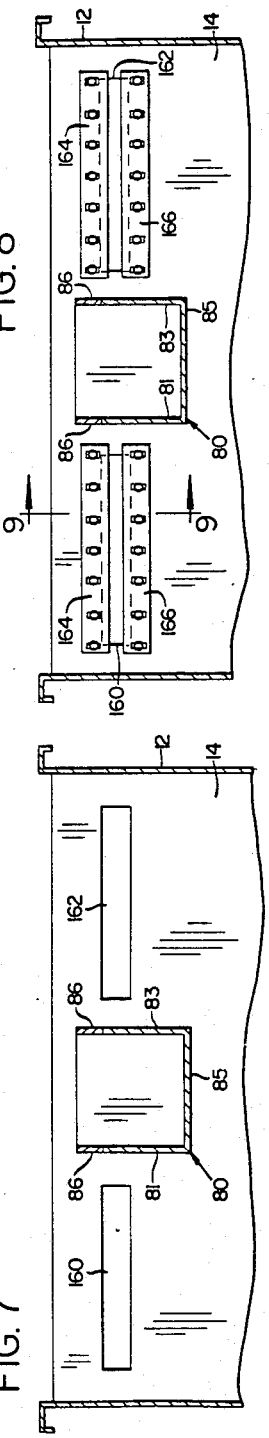
FIG. 8 is a side elevation view of the wall of FIG. 7 with adjustable weir plates partially covering the openings through the wall.

The embodiment shown in FIG. 8 is similar to the embodiment of FIG. 7, except that an adjustable mechanism is provided for selectively altering the size of the openings 160, 162. This mechanism is provided to minimize the size of these openings for added reduction of the undesired pass through of solids between the filter compartments during cleaning of the nonbuoyant media filter. In the illustrated form, this mechanism comprises a separate set of upper and lower weir plates 164, 166, each set being associated with a respective one of the openings 160, 162.

Figure 9:
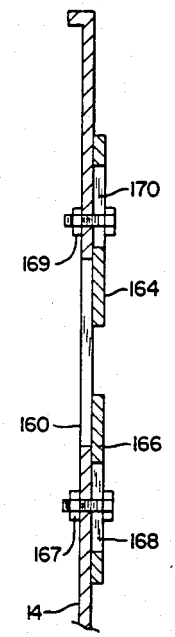
FIG. 9 is a vertical section view of a portion of the wall of FIG. 8, taken along line 9—9 thereof.

As can be seen from FIG. 9, fasteners such as bolts 167 are provided for mounting the weir plate 166 to the wall 14 so as to cover a lower portion of the associated opening. Similar fasteners 169 are provided for mounting the weir plates 164 in place so as to cover an upper portion of the associated opening. Elongated slots 168, one being associated with each fastener, are provided in the weir plates 166 to permit raising and lowering of these plates when the fasteners are loosened. Similar slots 170 are provided in the weir plates 164. Thus, the weir plates are adjustable in elevation.

During operation, the lower weir plates 166 are adjusted until their upper edges are at the same elevation. This equalizes the volume of water flowing over each of these weir plates. In addition, once the system is operational, the upper weir plates 164 are lowered until their lower edges barely impinge the flowing water stream. They are then fastened in this position. This establishes the openings 160, 162 at their minimum size for normal operation of the system. When so established, the undesired pass through of solids during cleaning of the buoyant media bed though the opening is reduced.

Figure 10:
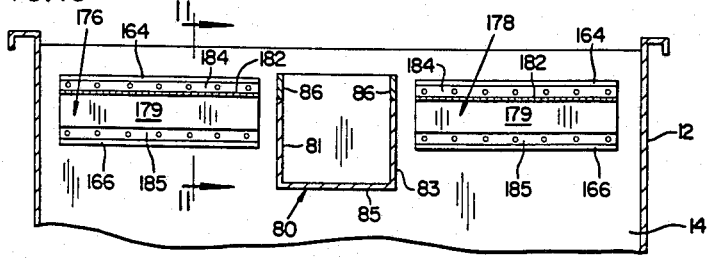
FIG. 10 is a side elevation view of the wall of FIG. 7 with gates covering the openings through the wall.
Figure 11:
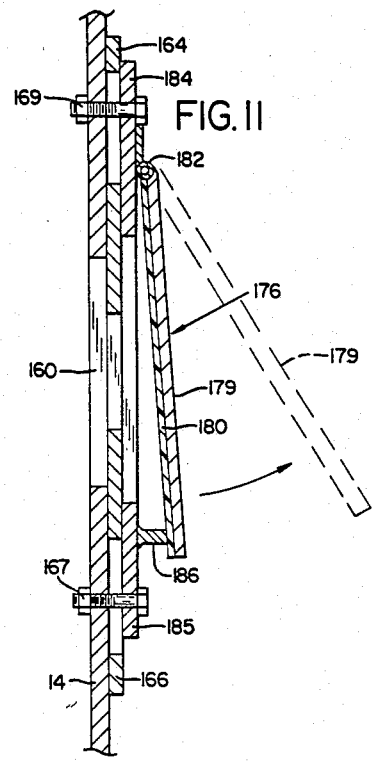
FIG. 11 is a vertical section view of a portion of the wall of FIG. 10, taken along line 11—11 thereof.

FIGS. 10 and 11 illustrate a further modification to the embodiment of FIGS. 8 and 9. In the embodiment of FIG. 10, a flap gate 176 overlies the opening 160 while a similar flap gate 178 overlies the opening 162. With reference to FIG. 11, the flap gate 176 comprises a plate 179 having a gasket or seal 180 mounted to the wall side of the plate. A hinge 182 secures the plate to a frame 184 which in turn is fastened by the fasteners 169, 167 to the wall 14. A lower frame portion 185 is also shown. The adjustable weir plates 164, 166 may also be included in this construction, as shown in FIG. 9. A gate seat 186 limits the downward tilting of the gate 176 to an inclined position.

D. Operation of the Embodiments of FIGS. 7 Through 11

Each of the embodiments of FIGS. 7 through 11 operate in the manner described above in connection with the embodiment of FIG. 1, except that water flows through the openings 160, 162 provided in the wall 14, rather than over the top of the wall.

Figure 12:
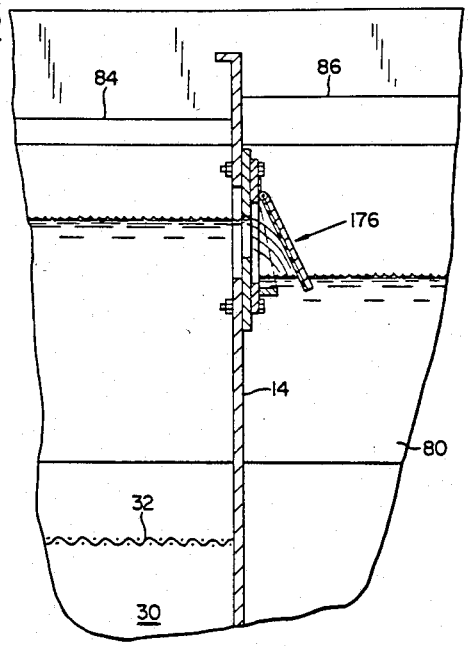
FIG. 12 is a vertical section view of the center wall portion of an alternate form of water treatment system in accordance with the invention, showing water being treated.

For example, FIG. 12 illustrates a system, including the flap gate of FIG. 11, during normal water filtration operation. Water flowing upwardly through the buoyant media filter bed 30 passes through the opening 160, between the upper and lower weir plates 164, 166, and pushes aside the flap gate 176 as it enters the downflow filter compartment 18. Filtering is accomplished in the same manner as described above in connection with FIG. 1.

Figure 13:
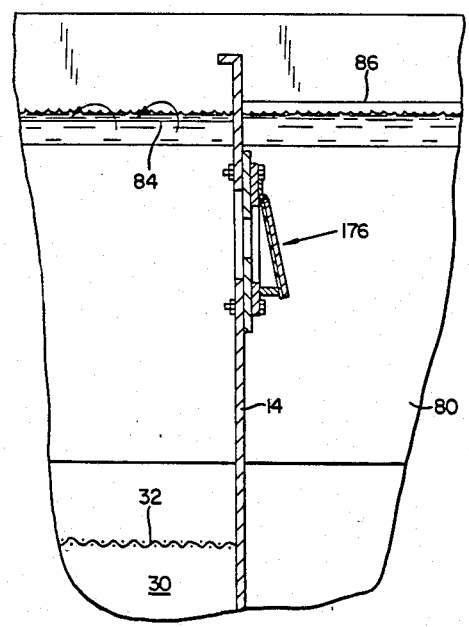
FIG. 13 is a vertical section view of the system of FIG. 12, showing the buoyant media filter being cleaned.

During cleaning of the buoyant media filter, as shown in FIG. 13, the flap valve 176 falls to a closed position under the influence of gravity. This minimizes the undesired pass through of solids dislodged from the buoyant media bed during cleaning.

Figure 14:
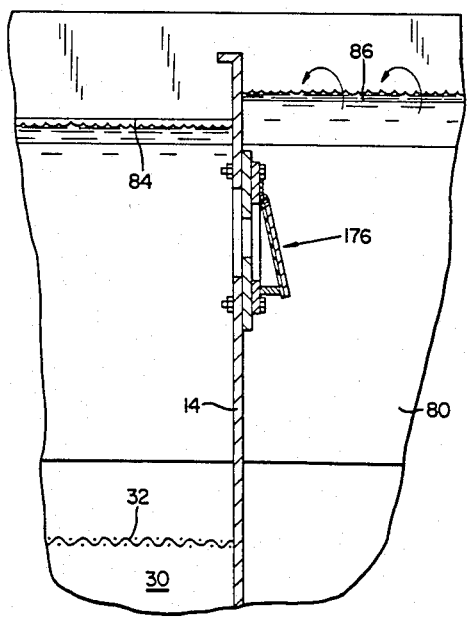
FIG. 14 is a vertical section view of the system of FIG. 12, showing the nonbuoyant media filter being cleaned.

When the nonbuoyant media bed is cleaned, as shown in FIG. 14, the gate again closes and is held closed due to the influence of gravity. Also, closing of the gate is assisted by the differential in head resulting from the different water levels at the downflow filter side of the wall 14 in comparison to the water level at the upflow filter side of the wall. Although not shown in FIG. 14, the buoyant media filter bed may be simultaneously cleaned.

Also, a small amount of water from a source (not shown) may be introduced into the downflow filter compartment 18 at times when buoyant media filter bed 30 is being cleaned. this would raise the water level within the downflow filter vessel, producing a differential in head on opposite sides of the wall 14. This would tend to hold the flap gate 176 closed during cleaning of the buoyant media bed.

E. Detailed Description of Filter System of FIG. 15

Figure 15:
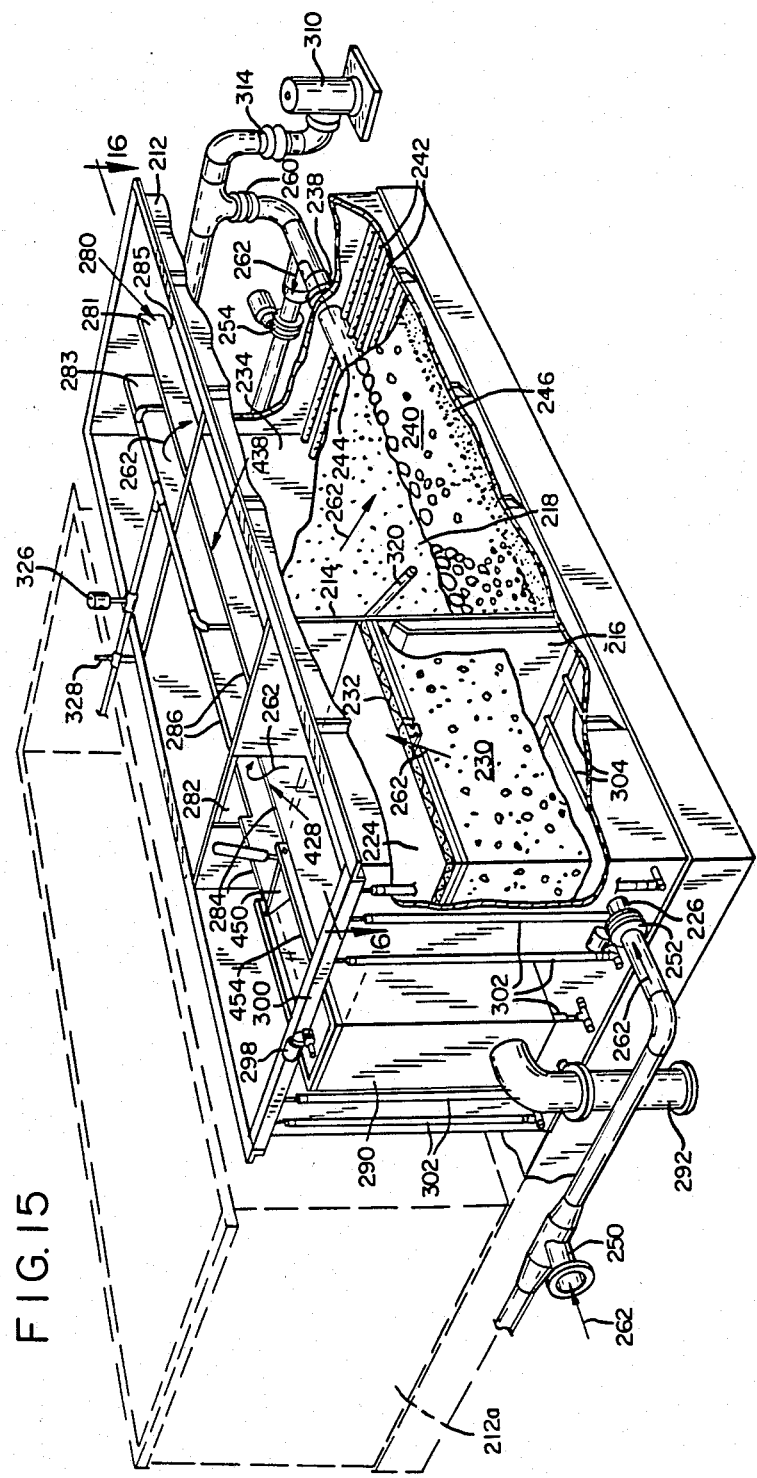
FIG. 15 is a perspective view of a second embodiment of a filter system according to the present invention, partially in section.

The apparatus of FIG. 15 is in many ways analogous to that shown in FIGS. 1-3. Corresponding features are shown in FIGS. 15-18 by identical reference numbers incremented by 200. New features are described, commencing with reference numeral 428.

In this embodiment, the upflow vessel outlet 428 is the top edge of a weir plate 284 of the central trough 280. The trough 280 carries partially filtered water through the center wall 214, for removing partially filtered water from the passageway 224. The downflow filter inlet 438 is the upper edge of the weir plate 286 which extends through the downflow filter vessel. Although not absolutely essential, it is preferred that, for this embodiment, the adjustable weir plates 286 be lower than the weir plates 284 so that, in essence, the trough steps down at the wall 214.

During normal operation, raw water to be treated is fed through the conduit 250 and the open flow control valve 252 to the upflow filter vessel 216. Water entering the inlet 226 flows upwardly through the buoyant media bed 230, over the top of the weir plate 284 which comprises outlet 428, through the trough 880, over the weir plate 286 which comprises inlet 438, and downwardly through the nonbuoyant filter bed 240 to the downflow filter vessel outlet 238.

The waste outlet of filter vessel 216 is the filter vessel outlet 428 and that the waste outlet of filter vessel 218 is the filter vessel inlet 438. Thus, the waste outlet of filter vessel 218 is effectively at a lower elevation than the waste outlet of the filter vessel 216.

A waste drain valve is provided. As shown in the drawing figures, the drain valve comprises a flap gate 450 located between the weir plates 284 and the well 290. Other devices, such as a valve in the conduit 292, could serve as the drain valve. In the illustrated embodiment, the trough walls 281, 283 extend over to the well 290 and are topped by two additional weir plates 454 which extend to an elevation above those of the weir plates 284 and 286. If there should be a system malfunction which would cause the level of liquid inside a vessel to rise above the weir plates 454, liquid would flow over the weir plates 454 and flap gate 450 into the well 290 and out through the drain conduit 292. This prevents any accidental overflow of liquid from the vessels 216, 218.

F. Operation of the Filter System of FIG. 15

With references to FIGS. 16, 17 and 18, the operation of the water filtration system of FIG. 15 will be described.

Figure 16:
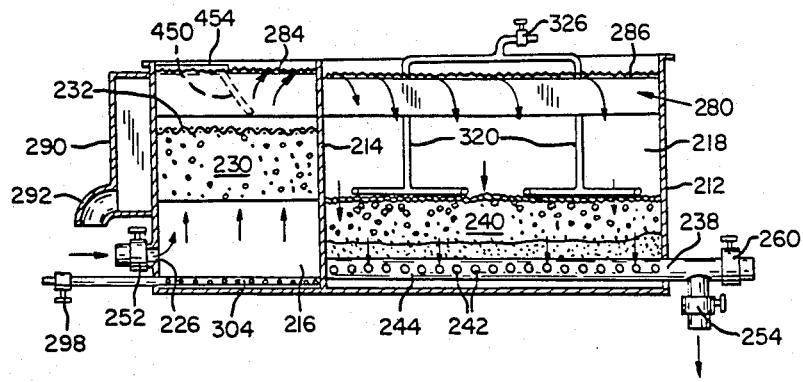
FIG. 16 is a vertical section view of the system of FIG. 15, taken along line 16—16 thereof, and showing water being treated.

During nommal operation, as shown in FIGS. 15 and 16, the flap gate 450 is closed and raw influent water enters the filter vessel 216 through inlet 226. This water flows upwardly through the buoyant media bed 230, over the top of the weir plate 84, through the trough 280, over the top of the weir plate 286, and into the downflow filter vessel 218. From there, the water passes through the nonbuoyant media bed 240, laterals 242, main line 244, and to the downflow filter vessel outlet 238. At such times, the backflush water supply valve 260 is closed while the effluent line oulet valve 254 is open. Consequently, the treated water flows from the outlet 238 into the clear well.

As with the embodiment of FIG. 1, partial cleaning of the buoyant media filter of FIG. 15 is accomplished sporadically, or at periodic predetermined time intervals, or in response to conventional pressure sensors which sense a change in head loss through the buoyant media filter.

Figure 17:
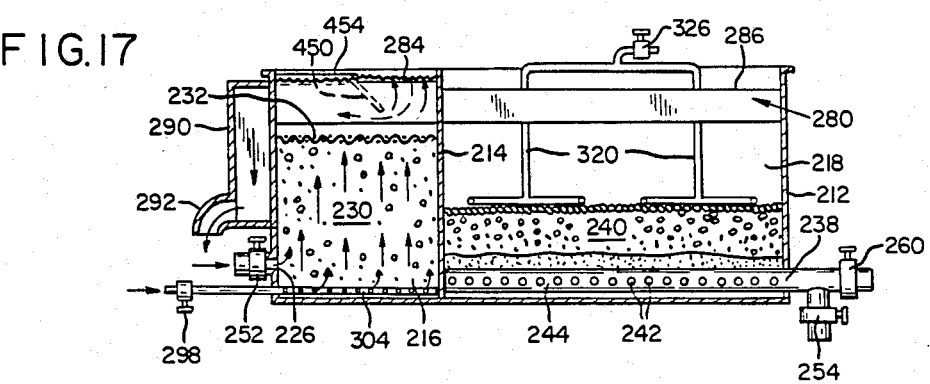
FIG. 17 is a vertical section view of the system of FIG. 15, taken along line 16—16 thereof, and showing the buoyant media filter being cleaned.
Figure 18:
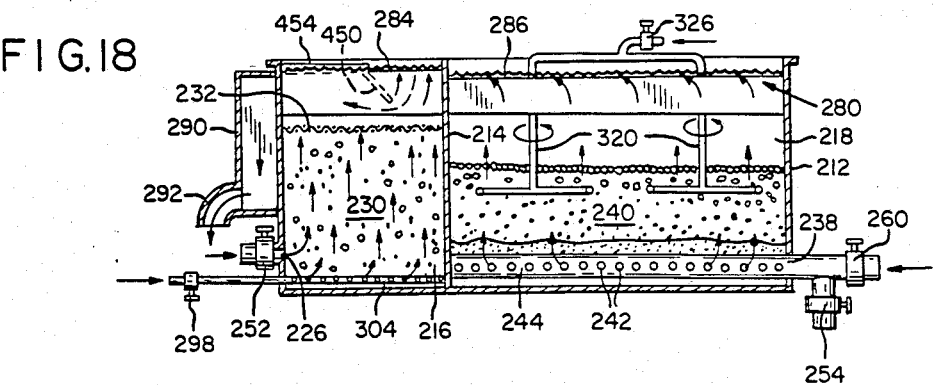
FIG. 18 is a vertical section view of the system of FIG. 15, taken along line 16—16 thereof, and showing the buoyant and nonbuoyant media filters being cleaned.

With reference to FIG. 17, in a typical application, partial cleaning of the buoyant media filter may be accomplished as follows. The plant influent valve 252 is temporarily closed, and the flap gate 450 is opened. The air inlet valve 298 is then opened, and the blower of air supply 296 turns on. Air is then distributed from the laterals 304 and upwardly through the buoyant media bed. This upwardly flowing air causes the bed to expand and fluidize. Furthermore, the air scours excess solids from the buoyant media bed and forms a slurry within the upflow compartment 216. After a short delay to enable the formation of the slurry, the influent valve 252 reopens so that raw water again enters the compartment 216. Cleaning may also be accomplished without halting the influent water flow.

During cleaning, water spills over the lip of weir plates 284 and into the trough 280. From trough 280, the wastes are carried past the flap gate 450 to the well 290 and through conduit 292 to the waste water sump. This water flushes dislodged solids from the buoyant media filter. Because it cannot flow back over the top of the weir plates 286 during cleaning of the buoyant media bed, partially treated water from the downflow filter vessel 218 is not lost. In addition, there is no undesirable carryover of solids from the buoyant media bed into the downllow filter vessel 218. This is because the level of liquid in the trough 280 never raises above the weir plates 286 so long as the flap gate 450 remains open.

Following cleaning, the air flow is stopped, the flap gate 450 is closed, and normal operation of the water treatment system continues.

Complete cleaning of the nonbuoyant media filter will be described with reference to FIG. 18. Upon commencement of the cleaning cycle, the effluent valve 254 is closed while the influent valve 252 remains open. Consequently, the water level within compartment 218 rises. Once the water level rises to a predetermined level as determined by level switches (not shown), flap gate 450 is opened and valve 326 is opened to supply surface wash water to the rotatable agitators 320. Water from these agitators breaks up a mat of deposited solids collected on the surface of the nonbuoyant media filter. These agitators facilitate quick fluidization and a bed expansion, as well as providing auxiliary agitation in the scrubbing of the bed particles. Thereafter, the backwash pump 310 is started while valve 260 is opened. Clean water from the clear well 258 is pumped at a controlled rate to the downflow filter compartment 218, the rate being determined by the setting of backwash rate control valve (not shown). The backwash water flows upwardly from the laterals 242 and through the nonbuoyant media bed 240. Under these conditions, the nonbuoyant media bed fluidizes and expands by approximately twenty percent. Also, the filter particles within the bed roll and scrub against each other to dislodge deposited solids. As can be seen in FIG. 18, the water level rises above the level of the weir plates 286 so that the solids and water from the compartment 218 pass over these weir plates, into the trough 280, and then to the waste system.

Typically, the buoyant media filter bed is cleaned simultaneously with the cleaning of the nonbuoyant media filter bed. In such a case, the cleaning steps for the buoyant media filter bed proceed as previously described.

Thus, the cleaning system of this embodiment uses a common trough both for transferring partially filter water to the downflow filter vessel and for collecting waste from the nonbuoyant and buoyant media beds, thereby eliminating an otherwise expensive duplication of equipment. This arrangement further reduces the number of valves and pumps utilized in the cleaning system and thus further reducing the cost of the overall system.

G. Formation of Floc Deck

The present invention, which involves the formation of a floc deck above the downstream filter bed, will be described in conjunction with the system of FIGS. 15-19, although it is equally applicable to the other systems previously discussed.

Figure 19:
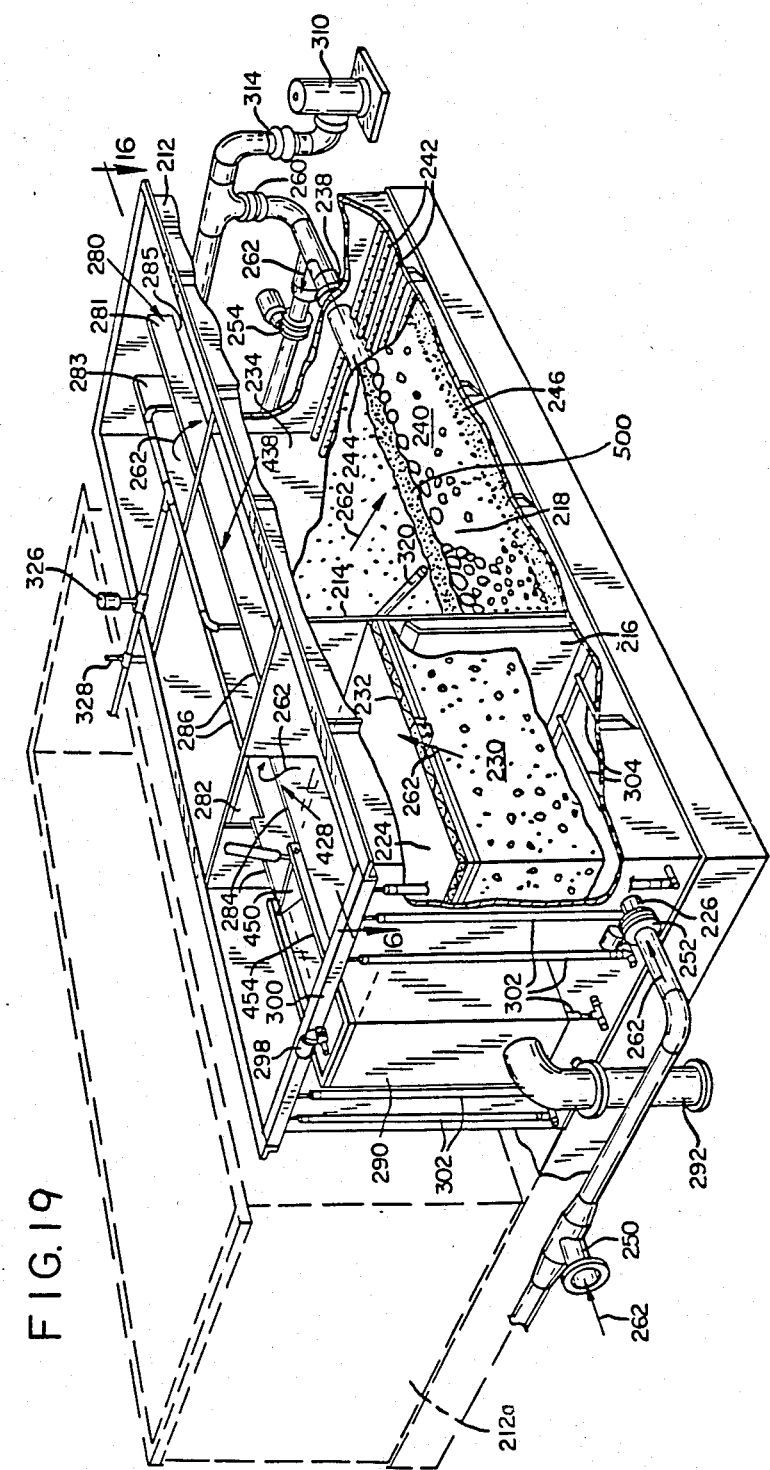
FIG. 19 is a perspective view of the embodiment of FIG. 15 illustrating a deck of suspended solids formed according to the present invention.

With reference to FIG. 19, raw influent water enters the filter vessel 216 through inlet 226. Prior to entry, the water is treated with coagulating chemicals. These chemicals preferably include alum and/or various commercially available polymer coagulants. About 10-100 mg/1 of coagulating chemicals are used. The treated water is directed upwardly through buoyant media bed 230, over the top of weir Plate 284, through trough 280, over the top of weir plate 286, and into the downflow filter vessel 218. From there, the water passes through nonbuoyant media bed 240, laterals 242, main line 244 and into the downflow filter vessel outlet 238. During this process, coagulated solid materials are collected within the nonbuoyant media bed 240.

Between the complete backwashings described above, a series of short duration backwashes are perfromed to establish and maintain a floc deck above the nonbuoyant media bed 240. The plant influent valve 252 and effluent valve 254 are first closed and effluent pumps (not shown) associated with such valves are deactivated. Thereafter, valve 260 is opened, and the bacwwash pump 310 is started. The pump 310 provides claan water from the clear well 258 at a controlled rate to the downflow filter vessel 218, the rate being determined by the setting of the backwash rate control valve 314. Preferably, water is pumped at a rate of 15 gal.-/min./square foot at 60° F. As a result, backwash water flows upward from the laterals 242 and through the nonbuoyant media bed 240 causing dislodgment of the coagulated materials therein. As the backwash water continues to move upwardly, such materials are lifted out of the non-buoyant media bed 240 into a zone 500 where they form a floc deck of loosely packed, highly permeable, suspended solids above the bed.

The backwash is of limited, five to seven second, duration so that the released solids are not carried out of the vessel 218. No surface washing or air scouring is used during such short duration backwashes so as not to agitate the filter bed. Backwashing in this manner results in a floc deck of maximum filtration capacity.

The time interval between the short duration backwashes depends on the turbidity, condition of the influent water, and rate of headloss increase in the nonbuoyant media. However, it is preferred that a short duration backwash occur at least every 60 to 180 minutes.

After each short duration backwash is completed, the system returns to normal operation. Backwash pump 310 is deactivated, backwssh valve 260 is closed, and valves 252 and 254 are opened. The subsequent operation of the system between short duration backwashes is substantially as described above.

Eventually, the nonbuoyant media bed 240 must be thoroughly cleaned, and the floc deck in zone 500 completely replaced or regenerated. This occurs when the short durttion backwash cyclenno longer significantly reduces filter headloss or when trapped solids break through the filter as seen by an increased solids content in the effluent 238.

For automatic operation, a timer can be used to initiate short duration backwashings at fixed time intervals, e.g., every two hours, while a pressure sensor monitors headloss. After each short duration backwash, headloss drops and then rises gradually until the time of the next short duration backwash. As more solids accumulate, the headloss reaches successively higher levels between short duration backwashes until eventually a predetermined pressure level, e.g., eight feet, is exceeded and the sensor triggers a full cleaning backwash.

Another method for automatic operation is to use a pressure sensor to trigger each short duration backwash, e.g. a short duration backwash is initiated each time the haadloss reaches eight feet. A full backwash is then initiated when the time period between short duration backwashes drops below a preset level, e.g. one hour.

Although its method of operation is not fully understood, the floc deck of the present invention appears to enhance operation of the overall filtration system by acting as a filter and by enhancing particle agglomeration. Apparently due to the presence of the upstream filter, the floc deck in zone 500 is surprisingly more effective than prior floc deck systems which lack an upstream roughing filter.

Formation of the floc deck enables the operating efficiency and economy of the filtration system to be greatly improved. Tests show that the solid materials which form the floc deck are different from those isolated in conventional clarification-filtration systems. As a result, the floc deck is very porous, and allows water to pass through easily with little or no flow resistance. Minimal headloss occurs in the system, allowing longer filter runs prior to full backwashing. This decreases the required amount of backwash water and reduces the amount of chemical coagulants needed in the process. Thus, the combined seeps of the present invention represent a significant advance in liquid purification technology.

Having illustrated and described the principles of the present invention, it should be apparent to those persons skilled in the art that such invention may be modified in arrangement and detail without departing from such principles. Thus, the invention shall include all such modifications as come within the true spirit and scope of the followin claims:

What is claimed is:

1. A method for enhancing the separation capacity of a multi-bed water filtration system comprising:
  providing a filter apparatus having an upstream filter bed that is bouyant during filtration, a downstream filter bed of nonbuoyant media, and backwashing means for moving water upwardly through said downstream filter bed at selected time intervals;
  treating raw water with at least one chemical coagulant;
  passing said treated water upwardly through said upstream filter bed to partially filter said water;
  passing said partially filtered water downwardly through said downstream filter bed to provide additional filtration of said water, said filtration causing coagulated materials from said water to be collected within said downstream filter bed;

periodically interrupting the flow of said partially filtered water through said downstream filter bed;

causing said backwashing means to move water upwardly through said downstream filter bed during said interruption of said flow of partially filtered water, said upwardly moving water comprising water previously filtered through said upstream and downstream filter beds, said upward movement of said water causing release of said coagulated materials collected therein, said released materials rising to a zone above the surface of said downstream filter bed to form a floc deck of coagulated materials thereabove; and resuming the flow of said partially filtered water from said upstream filter bed downwardly through said downstream filter bed, said water first passing through said zone of coagulated materials.

2. A method for enhancing the separation capacity of a multi-bed water filtration system comprising:

providing a filter apparatus having a filter bed that is buoyant during filtration, a nonbuoyant filter bed, and backwashing means for moving water upwardly through said nonbuoyant filter bed at selected time intervals;

treating water with a chemical coagulant;

passing said treated water upwardly through said buoyant filter bed to partially filter said water;

passing said partially filtered water downwardly through said nonbuoyant filter bed to provide additional filtration of said water, said filtration causing coagulated materials from said water to be collected within said nonbuoyant filter bed;

periodically interrupting the flow of said partially filtered water downwardly through said nonbuoyant filter bed;

causing said backwashing means to move water previously filtered through said buoyant and nonbuoyant filter beds upwardly through said nonbuoyant filter bed during said interruption of said flow of partially filtered water, said upward movement of said water occurring within discrete time intervals each being 5-7 seconds in duration in order to cause the release of said coagulated materials collected therein, said released materials rising to a zone above the surface of said nonbuoyant filter bed to form a floc deck of coagulated materials thereabove; and resuming the flow of partially filtered water from said bouyant filter bed downwardly through said nonbouyant filter bed, said water first passing through said floc deck.

3. The method of claim 2 wherein said time intervals are 60-180 minutes apart.

* * * * *